May 4, 1954 A. F. RYDIN 2,677,150

METHOD IN PRODUCING ARTIFICIAL TEETH

Filed July 31, 1950

Inventor:
Anders F. Rydin

Patented May 4, 1954

2,677,150

UNITED STATES PATENT OFFICE 2,677,150

METHOD IN PRODUCING ARTIFICIAL TEETH

Anders F. Rydin, Stockholm, Sweden

Application July 31, 1950, Serial No. 176,843

4 Claims. (Cl. 18—55.1)

My present invention relates to a method in producing artificial teeth of synthetic resinous material.

As well known, a natural human tooth comprises an inner core or body of dentine invested on its outer surface and crown with tooth enamel. The dentine core or body is opaque and substantially yellow or hoary, while the enamel coating is somewhat transparent or translucent and commonly clouded or colored at certain points or spots, and its main color, if any, is pale grey, pale yellow-grey, or pale red-grey. Furthermore, the enamel coating is opalescent or iridescent, and it transmits the color of the dentine core or body so that the general color appearance of the tooth, particularly an incisor, is quite indefinite and influenced by several facts, such as the thickness of the enamel coating, the length of transparent enamel projecting over the dentine core or body at the crown or cutting edge of the tooth etc.

Artificial teeth having an appearance nearly corresponding to such a natural tooth are previously known but they are expensive and difficult to make since a lot of painstaking labor is included in obtaining the correct color appearance and particularly in obtaining individual color spots, shadows and color modulations. Substantially one single way is open for the manufacture of such individual teeth and this is the so called "wet" way including moulding a composition of prepolymerized and monomer acrylate at a low temperature, cutting away parts of the body thus obtained before it has definitely hardened, replacing said cut away parts by new composition having another color, and finally hardening the body to a compact artificial tooth by further treatment thereof under heat and pressure.

An artificial tooth made this "wet" way may be individually shaped and colored, but the method of manufacture now described is not suited for making great series of identical teeth, which is a need if the production costs shall be lowered. This is because the layers built up in the "wet" mass tend to flow and they cannot be exactly placed and dimensioned.

Another way is open for the production of acrylic artificial teeth and this way comprises moulding pre-polymerized acrylate—commonly finely granulated material—in a pressure mold at a high temperature. This way is called the "dry" one—because there is no liquid present—and since it is more labor-saving than the "wet" one, cheaper, and more suited for a large production, the "dry" way has broadly superseded the "wet" way in practice.

However, it has proved very difficult to provide a realistic artificial tooth by the "dry" way and to obtain the desired distinctness of particularly the translucent coating and this is due to the fact that the "dry" way production must be carried out with excess of original material, part of which is pressed out of the mold during the molding operation thereby causing a current or flow of material in the moulded body and replacement and sliding of the layers which may have been previously built up by powdered material in the mold.

The main object of my invention is to disclose a method by means of which these disadvantages of the "dry" method may be overcome and consequently a large production or series of identical artificial acrylate teeth will be made possible. Particularly, it is the object of my invention to disclose a simple and inexpensive method for producing artificial teeth with great accuracy as regards the color appearance, which method may allow standardized production of a number of basic teeth or tooth bodies which may then be modified and corrected as to shape by the dentist before insertion in the mouth.

These and other objects will become apparent in reading the following description of a preferred method of mine in producing an artificial incisor tooth, references being had therein to the accompanying drawing, in which Fig. 1 shows a sectional elevation through a split mold used for molding teeth in the first step of its manufacture, said mold being adapted for molding two teeth having their longitudinal axes perpendicular to each other so that the view shows a longitudinal as well as a transverse section of a molding cavity, this being arranged for the sake of clarity only.

Figure 1:
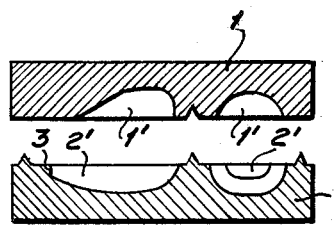
Figure 2:
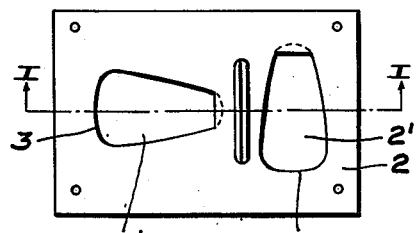
Fig. 2 shows a plan view of the lower mold half or part in Fig. 1 and the line I—I therein shows where the section in Fig. 1 is taken.

Referring now to the method, I prepare a suitable mold of the type shown in Figs. 1 and 2 particularly. This mold may be made of plaster or, preferably, of metal and, as will appear from the drawing, the mold comprises an upper and a lower half or a drag 1 and a cope 2, both of which are provided with molding cavities 1' and 2' respectively for each incisor tooth to be formed therein. The cavity 2' in drag 2 is adapted to receive the material forming the front or incisal portion of the tooth while the cavity 1' in the cope is adapted to form the back or lingual portion thereof. The drag cavity 2' is substantially countersunk in the drag 2, i. e. the division plane between the cope and the drag is located well above or rear of the front surface of the tooth and particularly well above or rear of the cutting edge of the incisor. Then an auxiliary cavity is formed at the rear of said cutting edge by cutting down from said division plane substantially perpendicularly to said cutting edge, so that the drag cavity 2' becomes provided with a substantially vertical wall portion 3 at this end. The cutting edge is understood as the end or edge of the incisor opposite the neck portion, i. e. the portion that becomes anchored in the mouth. The cavity 1' in the cope 1 has inclined walls to form a substantially frusto-pyramidical back portion of the incisor. This back forming cavity 1' is shorter in the longitudinal direction than the front forming cavity 2' in the drag 2 and so arranged that a pocket is formed in the lower mold half 1 near the cutting edge of the tooth as soon as the mold halves are pressed together. These features will be readily understood upon reading the following.

Figure 3:
Figs. 3, 4 and 5 show sections of the lower mold half or part during successive steps of filling.

As a first step in making the incisor I take powdered or finely granulated acrylate translucent and slightly pale grey, pale yellow-grey or pale red-grey colored and moisten it with a volatile liquid, which does not dissolve the acrylate, e. g. alcohol, but contains a small amount of an acrylate solvent as chloroform or the like, in such quantities that I get a plastic mass. This mass I introduce in the cavity 2' of the lower mould half 2 by means of a suitable spatula so that a coating 4 thereof remains on the walls and the bottom of said cavity as shown in Fig. 3. In doing so, I scrape off my spatula against the wall portion 3 so that the coating 4 slightly declines from the upper edge thereof, i. e. from the upper plane or the lower mold half. Of course, this coating may extend over various lengths of the cavity to produce various shading effects. The coating 4 is then allowed to dry but before that, I make suitable impressions 5 in the internal side thereof, so that the thickness of the coating becomes varying. I refer to make these impressions 5 with a special tool, which enables me to place the impressions at exactly the same points when I wish to make a plurality of similar teeth. If desirable, I also make a few recesses or holes 6 in the coating to imitate adjustments and silica fillings in the final tooth.

Figure 4:
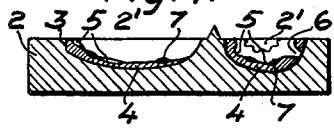

When the coating 4 has properly hardened, I make suitable color spots 7 on its inside by pouring small amounts of colored, dry acrylate granulate over the coating and particularly into the impressions and so I am ready to prosecute the material filling procedure, the lower mold half now appearing as shown in Fig. 4.

Figure 5:
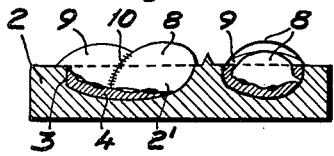

As the next step I take powdered or finely granulated acrylate having a yellow or bone-like color and pour it in a dry state into that portion of the lower mold cavity 2' which is intended to form the neck and central portions of the incisor, i. e. the portion remote from the cutting edge, and this is done in such a manner that the yellow material forms a heap 8 as shown in Fig. 5. Then I take the powdered or finely granulated translucent acrylate which I used in forming the coating 4 but in dry state and pour it in a heap 9 near the cutting edge of the incisor to be molded, i. e. near the wall portion 3 of the lower mold half cavity 2'. To avoid a sudden change between the yellow, opaque material in the heap 8 and the transparent, pale grey colored material in the heap 9 I take a spatula or like tool and push it down from above between the heaps thereby slightly mixing the materials thereof just in the intermediate plane as shown at 10 in Fig. 5.

Figure 6:
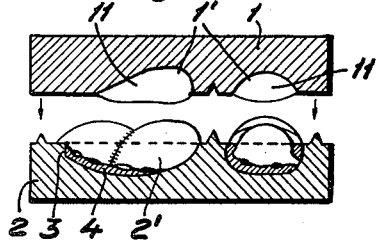
Fig. 6 shows like Fig. 1 a section of both mold halves but they are now filled with acrylic material and ready to be pressed together.

Now, the lower mold half 2 is ready for the final heat treatment but before subjecting it thereto I fill the cope cavity 1' with substantially the same material as used in the heap 8, i. e. a powdered or finely granulated acrylate having a yellow or bone-like color, which material 11 I fix in the mold cavity 1', for example by heat or pressure, so that it will remain in place during the interconnecting and pressing together of the mold halves 1 and 2 as referred to in Fig. 6.

The whole mold is now subjected to suitable heat and pressure in a manner known per se so that the material within the mold cavities will melt or sinter and form a compact body. Obviously the body components will remain in substantially the same position during the whole melting or sintering process and particularly that portion or end of the body which will form the outer or cutting edge of the incisor body is completely prevented from sliding due to the fact that it is retained in the abovementioned pocket in front of the vertical wall portion 3.

Figure 7:
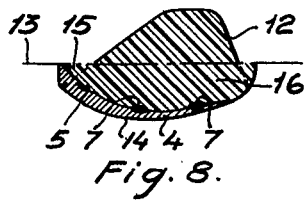
Fig. 7 shows a longitudinal section through a tooth body just molded.

When the heat treatment is finished I can pick out a body 12 of the mold having substantially the shape shown in Fig. 7, the division plane between the mold halves being shown by dash-and-dot line 13. The left hand portion of said body 12 in Fig. 7 is substantially formed by translucent, material descending from the heap 9 in Fig. 5 while the right hand portion is formed by the opaque material of the heap 8 in Fig. 5 and the similar material placed in the upper mold half cavity 1' before pressing the mold halves together. The lower part of the body 12 is covered by the coating 4 over a substantial length and width and this coating will form the front surface 14 of the incisor when finished.

Figure 8:
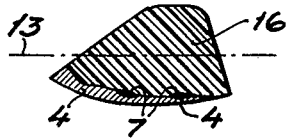
Fig. 8 shows the incisor tooth as Fig. 7 but treated by a final grinding process—the tooth being now ready for final insertion in the mouth—and Fig. 9 shows a transverse section of the ready tooth in Fig. 8.
Figure 9:
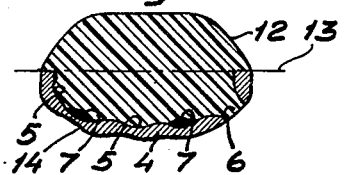

The body 12 in Fig. 7 is now finally treated by a cutting or grinding process whereby the final shape and appearance of the tooth is obtained. This process comprises particularly the cutting away of the rear wedge-like portion 15 on the back of the cutting edge of the tooth, i. e. the body portion formed in the auxiliary cavity above and rear of the cutting edge above described, so that the tooth gets a sharp and realistic cutting edge as shown to the left in Fig. 8, which is materially formed out of said translucent and but slightly clouded or shaded coating 4. The inner and neck portion 16 of the tooth obtains an indefinite opaque appearance due to the transmittance of the yellow or bone-like tone of the tooth back through the iridescent, translucent coating 4. The varying thickness of the coating 4 makes the color appearance quite indefinite and the color spots 7 merge into the back, the whole providing an appearance of the tooth that is hard to distinguish from that of a natural one.

Of course, my method may be carried out with other materials than referred to above, and it may be modified many ways without departing from the inventive scope since the process may be simplified for instance in making a tooth facade where no frusto-pyramidical tooth back is necessary, or it may be carried out in a more complicated manner including the provision of more coatings of different transparency instead of the single one in the case referred to above.

Also the tooth forming a part of this invention may be modified as to shape, size and structure within wide limits.

I claim:

1. In a method of making artificial incisor teeth, the steps of providing a two-part split mold comprising a drag having a mold cavity shaped to form the labial portion of a tooth including a cutting edge portion substantially thicker than the desired cutting edge of the finished tooth, and a cope having a cavity shaped to form the lingual portion of the tooth, applying to at least part of the bottom of the mold cavity in said drag a coating of substantial thickness of a translucent, modellable plastic mass comprising finely divided acrylate moistened with a volatile liquid that is a non-solvent of acrylate and contains only a small quantity of an acrylate solvent, the thickness of said coating being increased from the neck portion of the tooth toward the cutting edge and the portion of the mold cavity which forms the cutting edge being substantially filled with said material, making impressions on the exposed inner face of said coating to vary the thickness of the coating at selected spots, applying colored material to selected spots on the exposed inner face of said coating, filling the remaining cavity in the drag and the cavity in the cope with a less translucent acrylate in finely divided dry form, fixing said acrylate in the cope cavity so that it will remain in place, pressing said drag and cope together and subjecting the contents of the mold to heat to form a compact body thereof, removing said body from the mold and thereafter cutting away a portion of material from the rear of the thickened cutting edge portion to form a finished cutting edge.

2. A method of making artificial incisor teeth in a two-part split mold comprising a drag having a mold cavity shaped to form the labial portion of the tooth including a cutting edge substantially thicker than the desired cutting edge of the finished tooth, and a cope having a cavity shaped to form the lingual portion of the tooth, comprising the steps of spreading on at least a part of the bottom of the mold cavity in said drag a coating of substantial thickness of a translucent modellable plastic mass comprising finely divided acrylate moistened with a volatile liquid that is a non-solvent of acrylate and contains only a small quantity of an acrylate solvent to form a putty-like mass, the portion of the mold cavity which forms the cutting edge being substantially filled with said mass and the thickness of the coating decreasing toward the neck portion of the tooth, filling the remaining cavity in the drag and the cavity in the cope with a less translucent acrylate in finely granulated dry form, fixing said acrylate in the cope cavity so that it will remain in place, pressing said drag and cope together and subjecting the contents of the mold to heat to form a compact body thereof, removing said body from the mold and thereafter cutting away a portion of material from the rear of the thickened cutting edge portion to form a finished cutting edge.

3. A method of making artificial incisor teeth in a two-part split mold comprising a drag having a mold cavity shaped to form the labial portion of a tooth including a cutting edge portion and a neck portion and a cope having a cavity shaped to form the lingual portion of the tooth, comprising the steps of spreading on at least a part of the bottom of the mold cavity in said drag a coating of substantial thickness of a putty-like plastic material comprising finely granulated translucent acrylate moistened with a volatile liquid that is a non-solvent of acrylate and contains only a small quantity of acrylate solvent, said coating being of sufficient thickness substantially to fill the portion of the mold cavity which forms the cutting edge and the thickness of the coating decreasing toward the neck portion of the tooth, filling the remaining cavity in the drag and the cavity in the cope with a less translucent acrylate in finely granulated dry form, fixing said acrylate in the cope cavity so that it will remain in place, pressing said drag and cope together to subject the material therein to pressure and heating the material while thus pressed to form a compact body.

4. In a method of making artificial incisor teeth, the steps of mixing finely divided translucent acrylate with a volatile liquid that consists predominantly of a liquid which is a non-solvent of acrylate and contains a small proportion only of an acrylate solvent, sufficient of said volatile liquid being added to said acrylate to form a non-sticky mass that can be modeled to a desired shape and will retain the modeled shape, applying a layer of substantial thickness of said modellable acrylate material to at least the bottom of a mold cavity shaped to form the labial portion of a tooth including a cutting edge portion substantially thicker than the desired cutting edge of the finished tooth, the thickness of said layer being increased from the neck portion of the tooth toward the cutting edge, the portion of the mold cavity which forms the cutting edge being substantially filled with said modellable material, modelling said material to form impressions in the exposed inner face of said layer to vary the thickness of said layer at selected spots, filling the remainder of said mold cavity and a cooperating mold cavity shaped to form the lingual portion of a tooth with a less translucent acrylate in finely divided dry form, said added dry arcylate conforming freely to the modelled surface of said first-mentioned layer without disturbing the latter, setting said acrylate in said lingual mold cavity to permit the mold cavities to be brought together, molding the acrylate under heat and pressure, removing the molded tooth from the mold and thereafter cutting away a portion of material from the rear of the thickened cutting edge portion to form a finished cutting edge.

References Cited in the file of this patent

UNITED STATES PATENTS

| Number | Name | Date |
|---|---|---|
| 1,547,643 | Clapp | July 28, 1925 |
| 2,230,164 | Myerson | Jan. 28, 1941 |
| 2,314,957 | Thornton et al. | Mar. 30, 1943 |
| 2,332,537 | Slatis | Oct. 26, 1943 |
| 2,475,599 | Erdle | July 12, 1949 |
| 2,514,076 | Kelly | July 4, 1950 |
| 2,554,845 | Thornton | May 29, 1951 |